Dec. 16, 1924.

C. A. MORAN

POTATO BUG DESTROYER

Filed March 18, 1922  3 Sheets-Sheet 1

1,519,922

Dec. 16, 1924.

C. A. MORAN

POTATO BUG DESTROYER

Filed March 18, 1922

C. A. Moran
INVENTOR

BY Victor J. Evans
ATTORNEY

WITNESS:

Dec. 16, 1924.  1,519,922

C. A. MORAN
POTATO BUG DESTROYER
Filed March 18, 1922   3 Sheets-Sheet 3

C. A. Moran
INVENTOR

BY Victor J. Evans
ATTORNEY

WITNESS:

Patented Dec. 16, 1924.

1,519,922

UNITED STATES PATENT OFFICE.

CLARENCE AQUILLA MORAN, OF BRONSON, MINNESOTA.

POTATO-BUG DESTROYER.

Application filed March 18, 1922. Serial No. 544,875.

*To all whom it may concern:*

Be it known that I, CLARENCE A. MORAN, a citizen of the United States, residing at Bronson, in the county of Kittson and State of Minnesota, have invented new and useful Improvements in Potato-Bug Destroyers, of which the following is a specification.

This invention relates to insect exterminating devices, particularly to devices designed primarily for use in destroying potato bugs and the like, and has for its object the provision of a novel device designed to be drawn along a field in straddling relation to the rows of plants, the device being provided with means for brushing off the bugs or insects from the vines and being furthermore provided with means for catching and holding these bugs until the accumulation thereof may be subsequently destroyed by any suitable means.

Another object is the provision of a device of this character which is provided with a frame of arch shape whereby it may straddlingly engage over the row of growing plants without causing any injury thereto, the device being furthermore provided at opposite sides of the frame with pans which trail upon the ground and onto which the bugs are brushed by a movable brush element which is positively driven by the movement of the device along the ground.

Still another object is the provision of a device of this character in which the pans are so formed as to prevent the falling out of the bugs after they are knocked thereinto.

An additional object is the provision of a device of this character which will be simple and inexpensive in manufacture, easy to operate and control, highly efficient and durable in service and a general improvement in the art.

With the above and other objects and advantages in view, the invention consists in the details of construction to be hereinafter more fully described and claimed and illustrated in the accompanying drawings in which:

Figure 1:
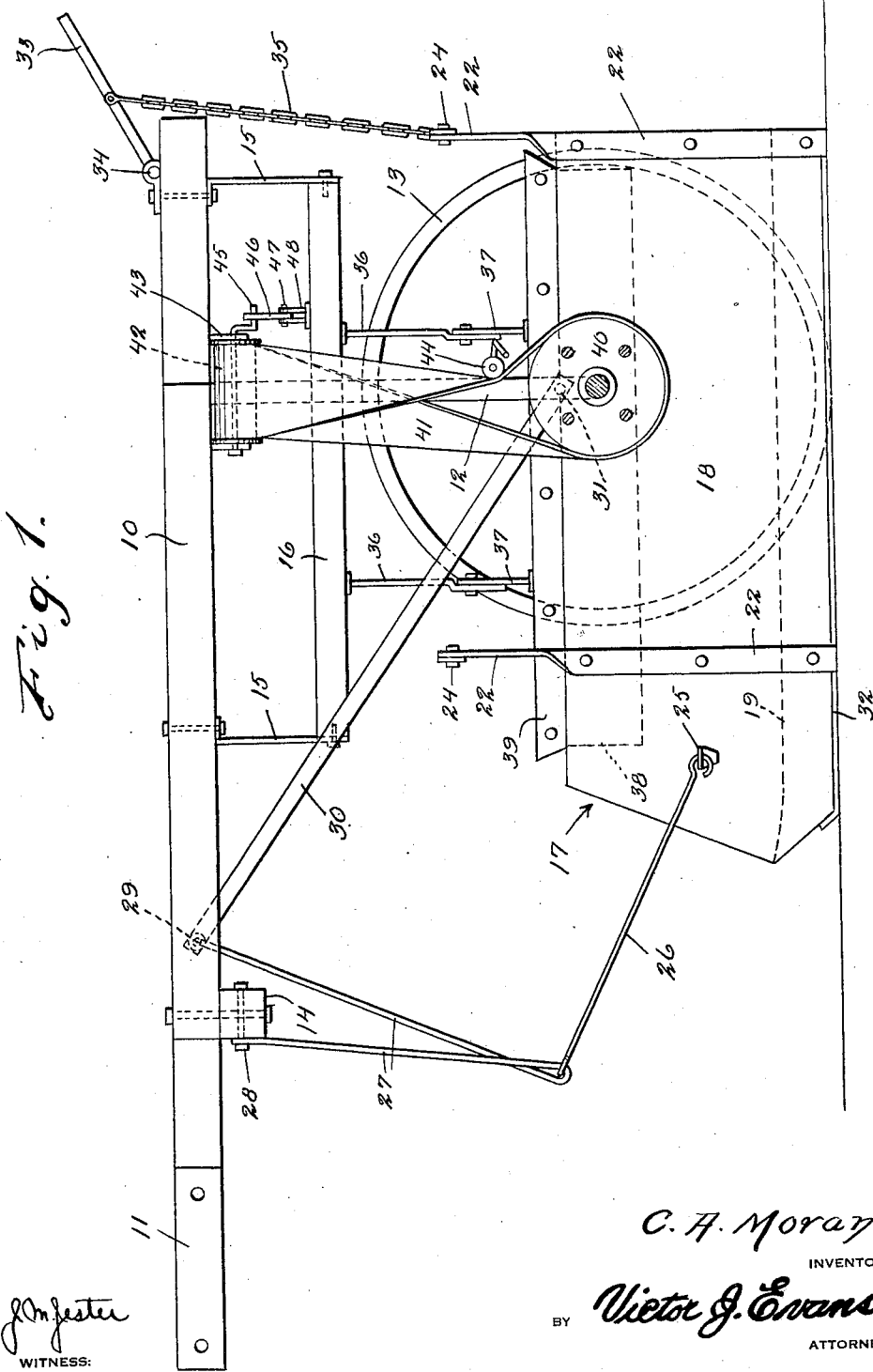
Figure 1 is a side elevation of the complete device.
Figure 2:
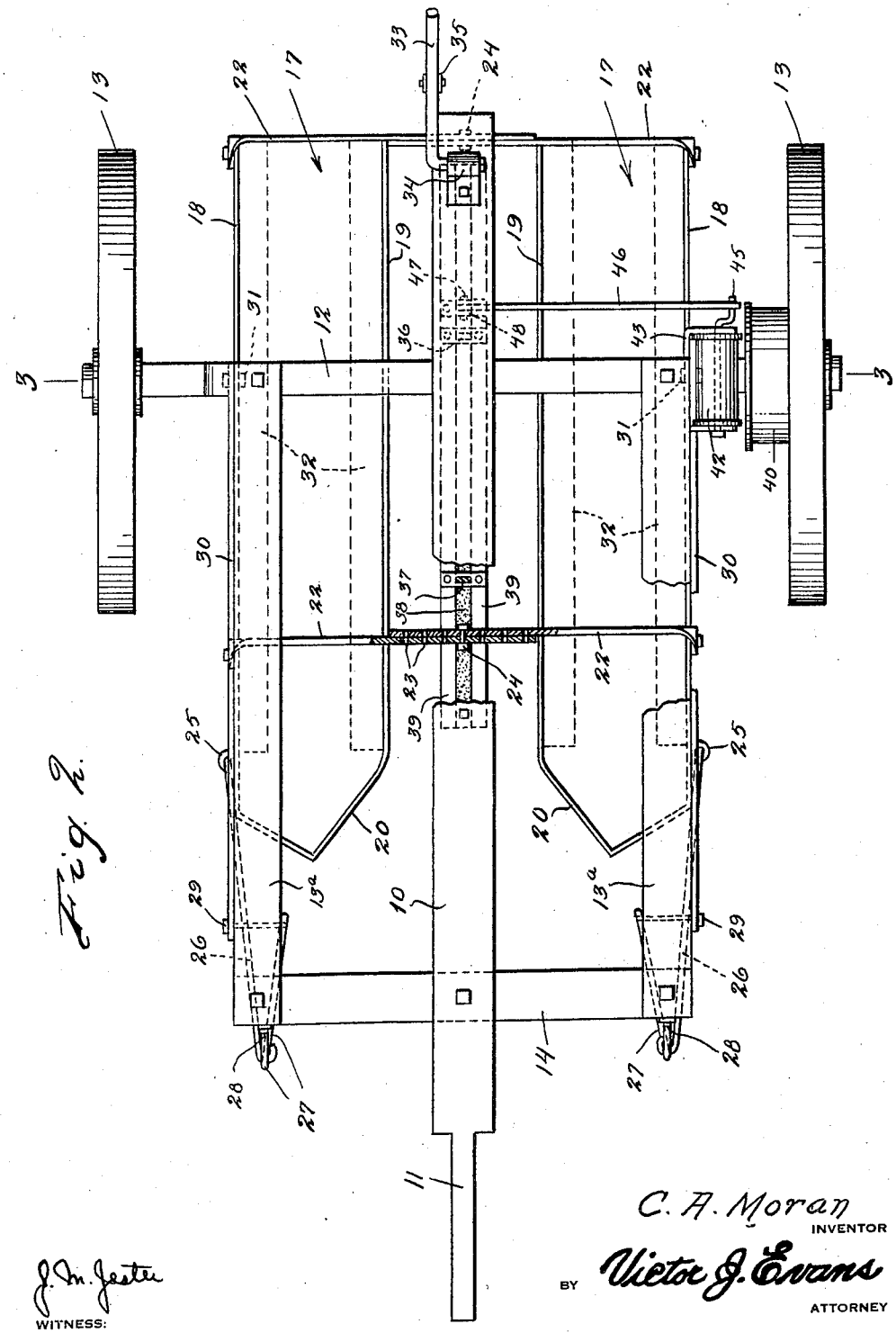
Figure 2 is a plan view thereof.
Figure 3:
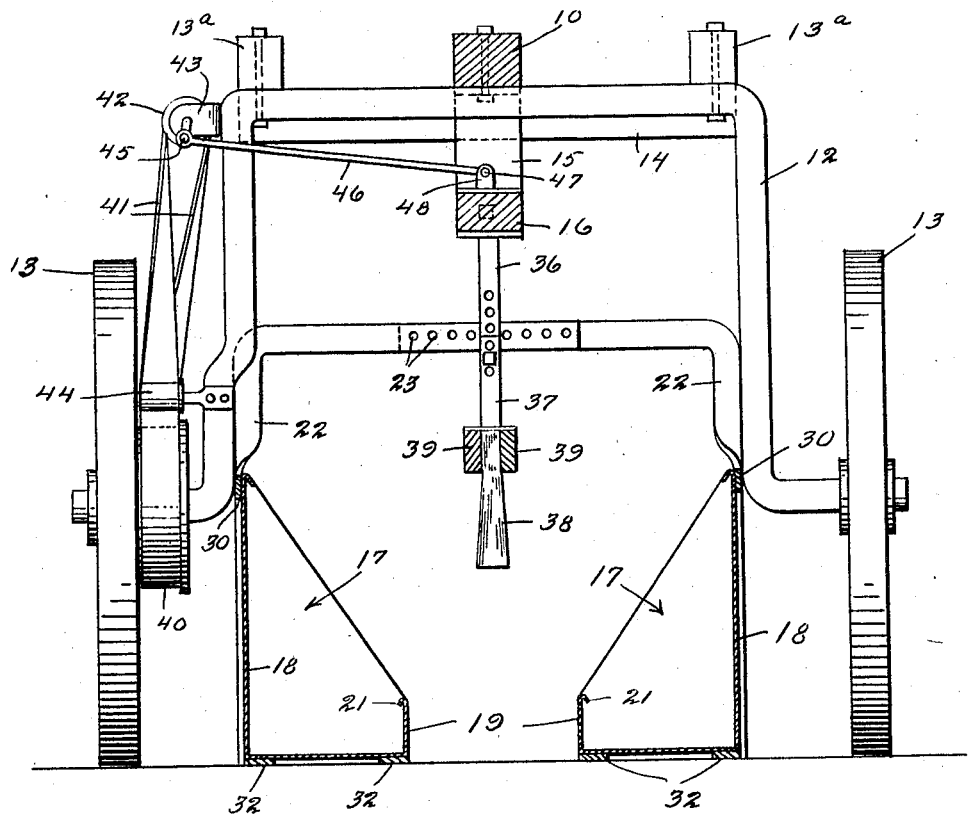
Figure 3 is a section on the line 3—3 of Figure 2.
Figure 4:
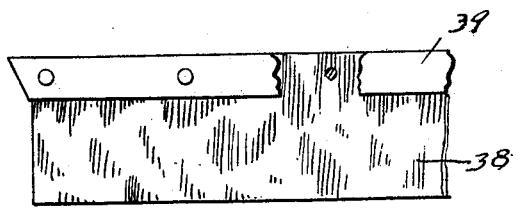
Figure 4 is a detail view of the brush.
Figure 5:
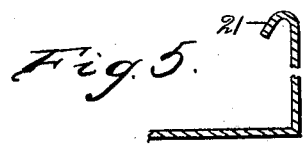
Figure 5 is a detail section showing the flange formation of the pans.

Referring more particularly to the drawings the numeral 10 designates an elongated central beam which has its forward end reduced as shown at 11 for connection with a suitable pole or tongue. This bar 10 is secured centrally upon an arch axle 12 which has its ends carrying ground engaging wheels 13. Disposed at the sides of the bar 10 and bolted at their rear ends to the axle 12 are bars 13ª to the forward ends of which is secured a cross bar 14 which is likewise bolted onto the bar 10. Secured on the underside of the bar 10 are brackets 15 between the lower ends of which is pivoted a longitudinally extending rockable bar 16 which is for a purpose to be described.

Disposed between the wheels 13 is a pair of pans 17 which have their outer sides 18 of greater height than their inner sides 19 and which have their inner sides in spaced relation for straddling a row of plants to be treated. The forward ends of the pans are enclined as shown at 20 to provide an entrance to the space between them. All the edges of the pans are inturned as shown to provide flanges 21 which will operate to prevent the crawling out of bugs which are knocked into the pans by the means to be described. Secured to the outer sides 18 of the pans near the front and rear ends thereof are L-shaped arms 22, which have their horizontal portions overlapping and formed with holes 23 through selected registering ones of which are passed securing bolts 24. By this means it will be seen that the pans may be adjusted toward or from each other to meet variations in the width of the row of plants to be treated or the character of the plants. Carried by the pans near the front ends thereof are ears 25 within which are connected the rear ends of rods 26 which have their forward ends pivotally engaged within the lower ends of V-shaped brackets 27 which have their forward arms secured at 28 to the cross member 14 and which have their rear arms connected as shown at 29 with the forward ends of bars 30 which are enclined rearwardly and downwardly and which have their rear ends pivotally connected at 31 with the outer sides of the pans at the rear ends thereof. This structure constitutes the suspension means for the pans. Ordinarily the pans are intended to trail upon the ground and for this reason they are provided at their undersides with runners 32 of any desired formation.

It is desirable to provide means for adjusting the vertical position of the pans and to accomplish this I provide a lever 33, pivoted at 34 on the top of the bar 10 at the rear end thereof. Connected with this lever is a chain 35 which has its lower end connected with the overlapping brackets 22. By moving the lever 33 up or down the position of the pans may be varied.

Depending from the bar 16 are rods 36 with which are adjustably connected rods 37 which carry a brush structure which includes an elongated bundle of broom corn 38 or the like, clamped between bars or strips 39. This brush is designed to be swung back and forth across the row of plants being treated so as to knock off the bugs. In order to effect movement of the brush, I provide a pulley 40 which is carried by one of the wheels 13 and about which is trained a belt 41 which is crossed as shown and which is trained about a small pulley 42 journaled within a bracket 43 carried by the axle 12. The numeral 44 designates a belt tightening roller which is carried by the axle and which may be provided with any adjusting means for insuring proper tension on the belt. The shaft of the pulley 42 is formed at one end with a crank 45 upon which is engaged a pitman 46 which is pivotally connected at 47 with a bracket 48 secured upon the rocking bar 16.

In the operation of the device it will be seen that it is drawn along the ground in straddling relation to a row of plants from which it is desired to remove the bugs, the arch construction which supports the beam or tongue permitting this action and preventing injury to the growing plants. As the device travels along the rotation of the ground engaging wheels will cause rotation of the pulleys 40 and 42 and which will impart reciprocatory movement to the pitman 46 which will operate to rock the bar 16 and consequently swing the brush structure back and forth in contact with the plants so that the bugs thereon will be knocked off and will fall into the pans from which they cannot subsequenty crawl out owing to the provision of the flanges 21. After a number of bugs have been accumulated in the pan it is apparent that the bugs may be destroyed by any desired means as for instance by fire or by means of a suitable insecticide.

Owing to the simplicity of the construction and the fewness of the parts it is apparent that there is nothing to get out of order and that the device should consequently have a long life and satisfactorily perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

Having thus described the invention I claim;

1. In a machine of the character described, an axle formed as an arch provided at its ends with stubs carrying ground engaging wheels, forwardly extending bars connected with the axle, a cross member connecting the forward ends of said bars, a tongue secured upon said cross bar and upon the axle, downwardly extending brackets carried by said cross bar and the forward ends of the longitudinal bars, a pair of pans arranged in spaced relation, links pivotally connected with the forward ends of the pans and with said brackets, bracket means connected with the rear ends of the pans, a flexible member connected with said bracket means, and a lever pivoted on the rear end of the tongue and connected with said flexible member whereby to effect raising and lowering of the rear ends of the pans.

2. In a machine of the character described, a wheel supported frame having draft means, a pair of pans suspended below the frame in spaced relation, a bar mounted below the frame, a brush member extending longitudinally below said bar and between said pans, vertically adjustable hangars for the brush connected therewith and with said bar, a roller journaled at one side of the frame and arranged with its axis parallel with the longitudinal axis of the frame, a crank carried by the roller having a link connection with the brush, and means driven by one of the wheels for rotating said roller.

In testimony whereof I affix my signature.

CLARENCE AQUILLA MORAN.